United States Patent
Cozza et al.

(10) Patent No.: US 9,327,954 B2
(45) Date of Patent: May 3, 2016

(54) LIFTING SYSTEM FOR DISPLAY CASES

(71) Applicants: Charles Frank Cozza, Santee, CA (US); Gerry H. Taylor, Carlsbad, CA (US)

(72) Inventors: Charles Frank Cozza, Santee, CA (US); Gerry H. Taylor, Carlsbad, CA (US)

( * ) Notice: Subject to any disclaimer, the term of this patent is extended or adjusted under 35 U.S.C. 154(b) by 428 days.

(21) Appl. No.: 13/895,322

(22) Filed: May 15, 2013

(65) Prior Publication Data

US 2013/0306925 A1    Nov. 21, 2013

Related U.S. Application Data

(60) Provisional application No. 61/647,418, filed on May 15, 2012.

(51) Int. Cl.
| | |
|---|---|
| *B60P 1/48* | (2006.01) |
| *B66F 19/00* | (2006.01) |
| *B60B 33/00* | (2006.01) |
| *B66F 11/00* | (2006.01) |
| *B66F 15/00* | (2006.01) |
| *B60B 19/00* | (2006.01) |

(52) U.S. Cl.
CPC .............. *B66F 19/00* (2013.01); *B60B 19/003* (2013.01); *B60B 33/00* (2013.01); *B60B 33/0044* (2013.01); *B66F 11/00* (2013.01); *B66F 15/00* (2013.01); *Y10T 16/191* (2015.01)

(58) Field of Classification Search
USPC .......................................................... 254/8 R
See application file for complete search history.

(56) References Cited

U.S. PATENT DOCUMENTS

| | | | | |
|---|---|---|---|---|
| 1,666,454 | A * | 4/1928 | Johnson | B66F 1/00 254/132 |
| 2,156,930 | A * | 5/1939 | Eugene | B66F 1/00 254/133 R |
| 3,023,919 | A * | 3/1962 | Hobson | B66F 9/16 414/607 |
| 3,085,656 | A * | 4/1963 | Hopfeld | B62B 1/20 187/231 |
| 7,780,389 | B1 * | 8/2010 | Young | B62B 3/022 280/43.22 |
| 8,192,126 | B1 * | 6/2012 | Young | E04F 21/1811 187/288 |

FOREIGN PATENT DOCUMENTS

| | | | | |
|---|---|---|---|---|
| DE | 19508491 | A1 * | 9/1996 | B66F 7/02 |
| EP | 0716041 | A1 * | 6/1996 | B66F 19/00 |

\* cited by examiner

*Primary Examiner* — Lee D Wilson
*Assistant Examiner* — Alvin Grant
(74) *Attorney, Agent, or Firm* — Donn K. Harms

(57) ABSTRACT

A device for moving store display cases or gondolas which are elevated above a support surface by support posts. The device features a body supported for rolling on the support surface by at least one rotationally engaged wheel. The body has an upper surface dimensioned for an engagement with an underside of said horizontal support member supported by a support post which maintains the support post elevated from the support surface to allow a rolling of the display case or gondola on the wheel of the body. The wheel may have a circumferential edge having rotational rollers rotating traverse to the direction of rotation of the wheel, thereby allowing rolling of the body and supported display, in four directions without steering the wheel.

15 Claims, 5 Drawing Sheets

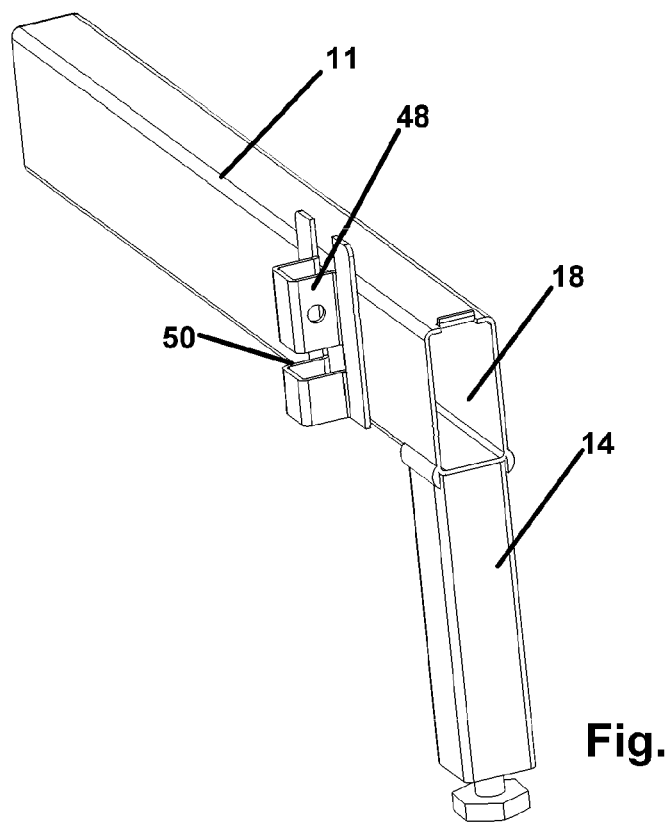
Fig. 4
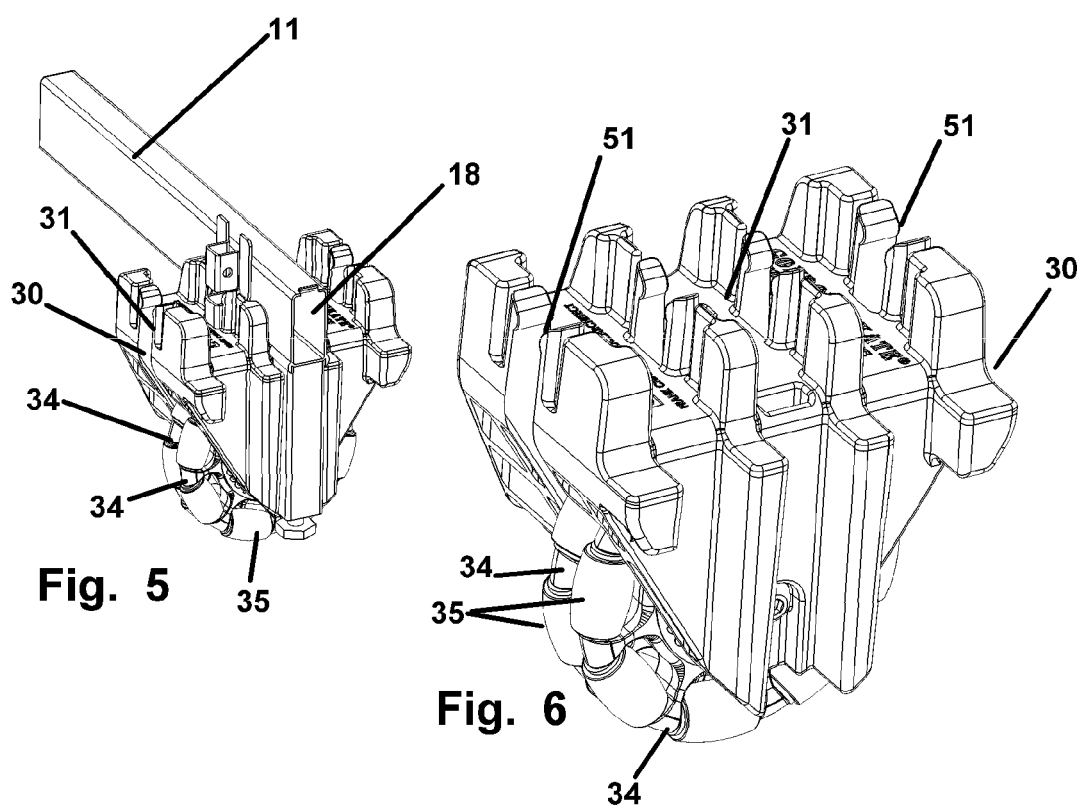
Fig. 5
Fig. 6

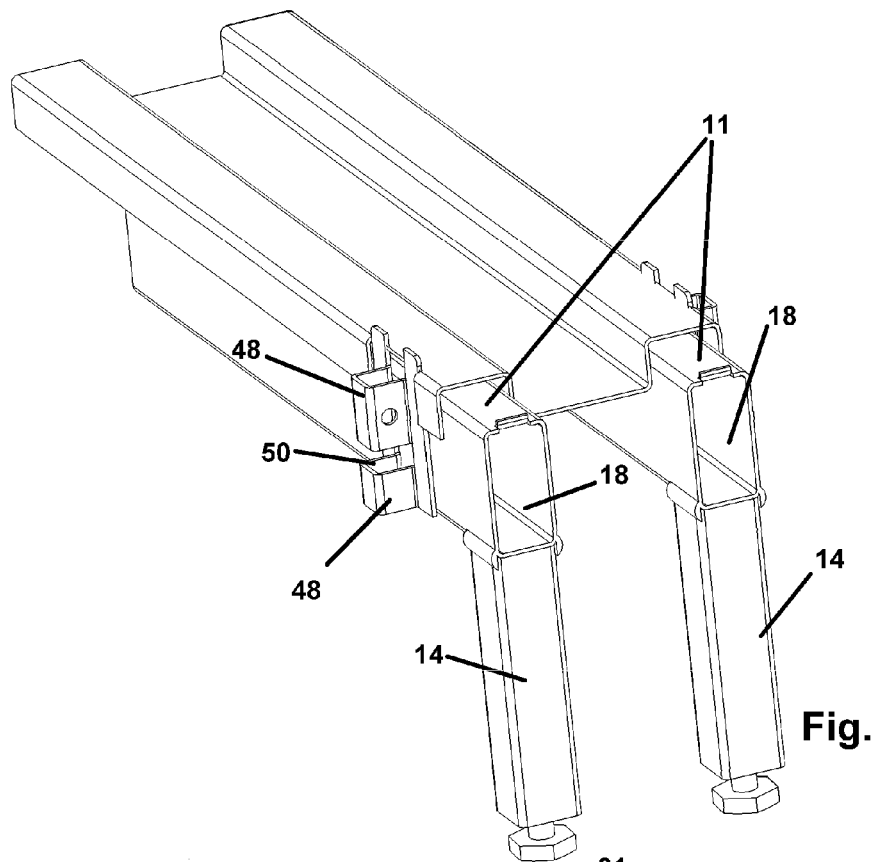
Fig. 7
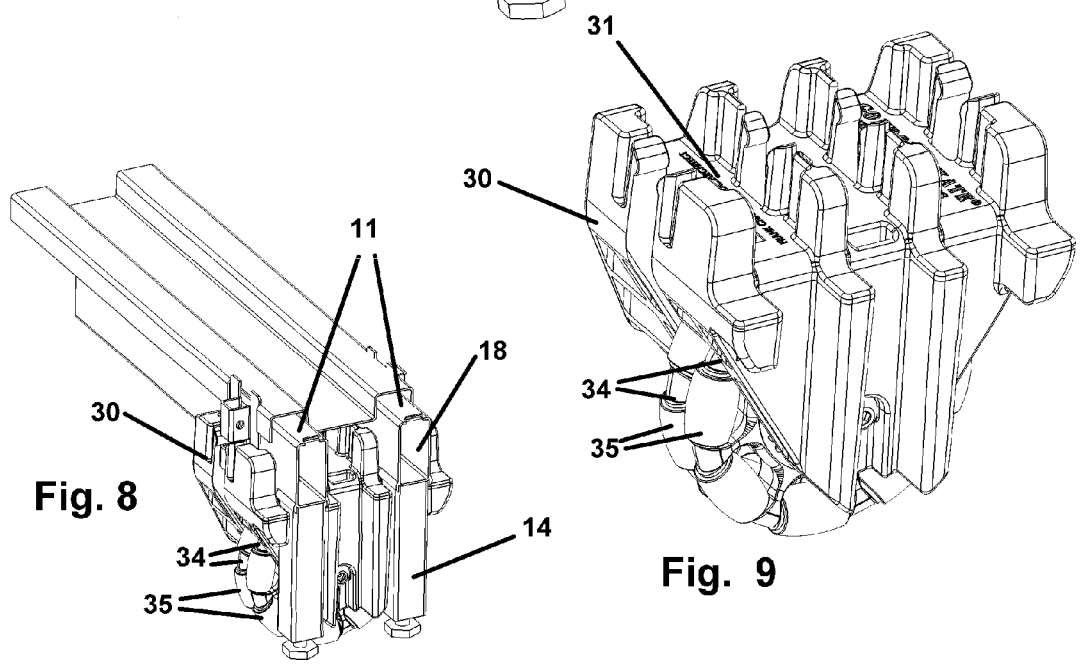
Fig. 8
Fig. 9

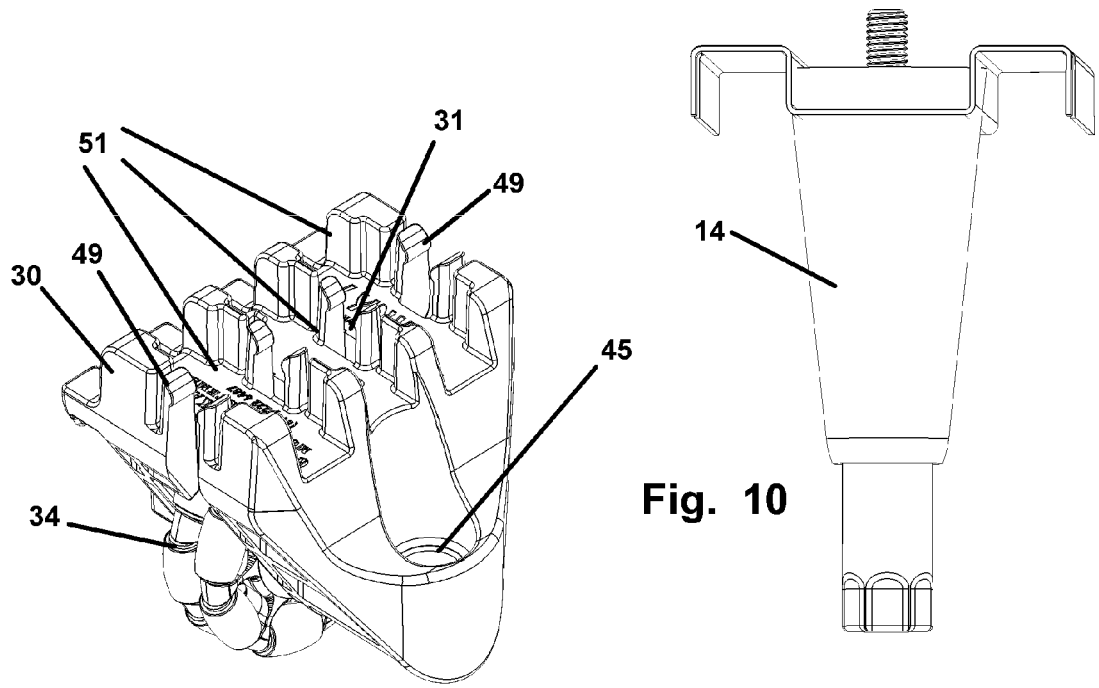
Fig. 10
Fig. 11
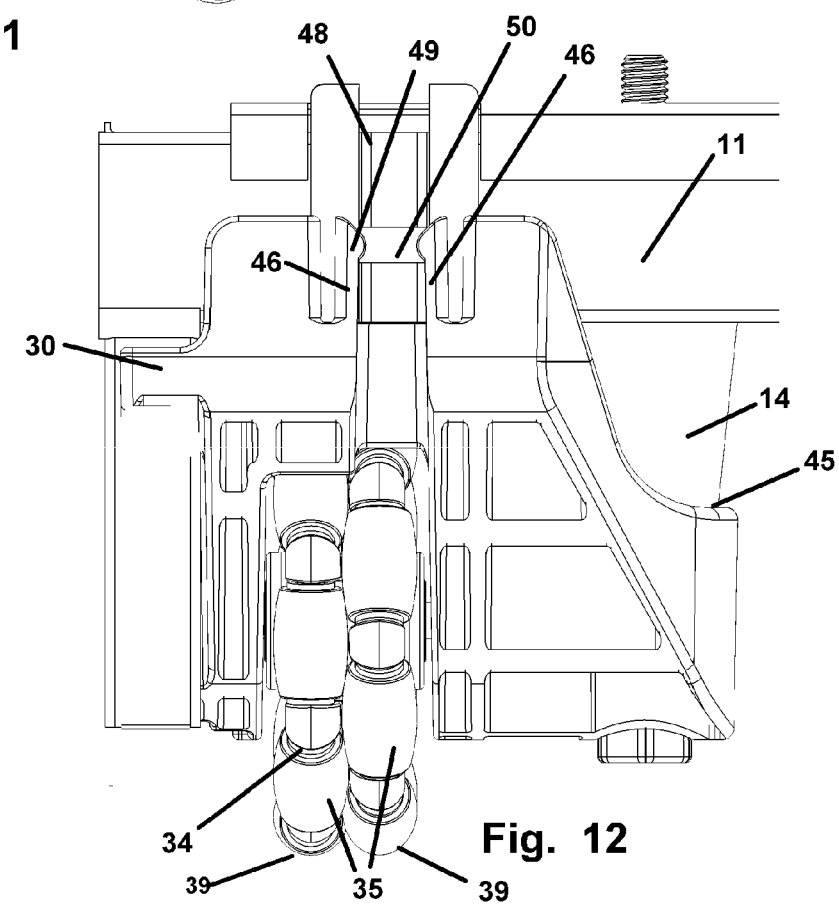
Fig. 12

LIFTING SYSTEM FOR DISPLAY CASES

This application claims priority to U.S. Provisional Patent Application Ser. No. 61/647,418 filed on May 15, 2012 and incorporated in its entirety herein, by this reference.

BACKGROUND OF THE INVENTION

1. Field of the Invention

The present invention relates to lifting shelves. More particularly, it relates to a system for lifting and supporting on rolling supports, display structures such as retail store display cases commonly known as gondolas, which employ a system of legs for support of shelves on a floor surface, such as those employed in convenience stores such as 7-ELEVEN.

2. Prior Art

Storage and display shelving and cases are conventionally employed to display goods for customers visiting grocery, department stores and convenience stores. Because floor space in most retail stores is at such a premium, and in order to conserve floor space in retail and commercial situations and to provide better viewing and access to products, such shelving is commonly employed to hold products.

In a retail setting such as a convenience store that sells food, beverages, groceries, and dry goods, such shelving is generally arranged to form aisles therebetween for customers to traverse through adjacent shelf structures. In convenience store settings, some shelving is adapted to hold food which may be ready to eat or may need condiments added. Other shelving is configured to hold drinks and self-serve food products, while other shelving may hold groceries and other products which customers are used to purchasing in such convenience stores for instance such as the 7-ELEVEN chain of stores.

In such a retail setting as convenience stores, such shelving undergoes heavy use by the buying public. It is, therefore, subject to repairs and replacement much quicker than shelving used in large department stores and grocery stores which is bigger in scope and in generally is not employed by customers preparing food and drinks.

A vexing problem of such convenience store shelving, by nature of a need to support a load in some instances, and to allow for food preparation and the like, is the ongoing need to move such shelving for maintenance and replacement and cleaning. Further, maintenance of the supporting floors underneath such convenience store shelving is also a constant requirement due to the ongoing preparation of food and beverages overhead, and the high traffic volume through such stores. Dropped food and drinks present a health hazard as well as the potential for odors and slippery and sticky floors, all of which are undesirable in such a convenience store setting.

Unlike grocery store shelves which have tall shelving supporting multiple shelves vertically, and vertical risers supporting both, convenience store shelving is generally different as dictated by its venue and use. Such shelving is generally shorter in length and height, for instance, the gondola shelving sold and employed in 7-ELEVEN stores, by Royston LLC of Jasper, Ga., whose catalog for such shelving is made part hereof in its entirety.

In order to lift and move such shelving in the small confines of a convenience store, it is desirable to have components which allow for easy lifting, easy movement, and easy replacement to the shelving's original position after the cleaning of floors and walls of the venue, and/or repairing the gondola shelving. This need for ease, and for speed is multiplied by the fact that such convenience stores are frequently open 24 hours a day and frequented by customers who need to use the shelving in an ongoing fashion in order to prepare food products which generates store revenue. Moved shelves, thus cause loss of revenue and inconvenience for store owners and store patrons alike. The ability to easily move, clean, and replace the shelving to its original position is something currently lacking.

As a consequence, there is a continuing unmet need for an improved device and system of components, which provides for easy, quick, and safe support and movement of the relatively smaller specialized gondola shelving employed in convenience stores. Such a system should be easily customized to lift the different type smaller gondola shelves and quickly move them in the crowded and busy confines of a convenience store locale. Additionally, such a system should preferably eliminate the need for power or hydraulic jacks to lift the gondolas by their supports, since such jacks are slow and generally unsafe for use while engaged to shelving in the busy customer filled confines of a retail environment.

Finally, such a system and device should provide for safe elevated and wheeled support of the shelving being moved. Concurrently when supported the system should enable easy movement of the supported shelves in any direction without turning wheels during movement, and an easy manner to return the moved shelving to its original position once cleaning and repairs to the support surface and/or the shelves is finished.

SUMMARY OF THE INVENTION

The device and method herein disclosed and described achieves the abovementioned goals through the provision of an adaptive lifting system which provides for the easy and quick engagement with the axial passages of horizontal cross members employed to support convenience store and similar gondola shelves, such as those manufactured and sold by Royston LLC of Jasper, Ga., which are shown herein for exemplar sake and ease of explanation.

This lifting component features one or a pair of forks projecting from a wheeled chassis. The forks project and are sized and spaced for operative engagement under, around, or preferably within the horizontal axial passages of the support members of the noted gondola shelving. Extending opposite the forks from the chassis is an elongated lever of a length adapted to provide the mechanical advantage to lift the fork-engaged gondola shelving to an elevated position, without a jack or power equipment, through a tilting of the chassis by the lever. Once in the elevated position, gondola skates, having body portions adapted to operatively engage with the support members of the gondola shelves, and vertically projecting legs, may be rolled thereunder and securely engaged thereto. Both the vertical leg and the horizontal support member of the gondola shelving, are concurrently engaged with complimentary depressions in the body, when the gondola shelving is lowered toward the support surface, by a raising of the lever.

Once all the supporting cross members and projecting legs therefrom, are engaged upon supporting surfaces of the supplied gondola skates, the gondola shelves and their support legs are held in an elevated position and may be easily slid in any direction, without having to turn wheels to steer the supporting body, while in the cramped confines of the convenience store setting.

The wheeled support for the gondola skates provides for either easy pivoting of the support wheel, or the employment in a favored mode of the system of a multi directional wheel having two support edges, which is easily rolled along four axes without the need to pivot the wheel itself to steer.

This multi directional wheel is favored since heavy shelving generally requires actual movement of at least a few inches in order to pivot and steer with a rotatable wheel support. This may be a few inches too many to function in the close confines of a convenience store. In the disclosed device and system, no such movement or steering of the wheels supporting the gondola is required. Instead, dual supporting circumferential edges of the multi directional wheels have rollers allowing rotation and movement in any direction of the stationary wheel, in order to change direction of movement of the shelf or gondola, or initiate a rolling in any of the four directions the wheel will roll.

The gondola skate body of the system herein, is adapted to support the horizontally disposed overhead cross members of the shelving in using a complimentary mechanical engagement of the body surface with the existing exterior member surfaces, or a saddle type engagement surrounding existing member surfaces. Engagement of both the horizontal supporting member, and any vertically disposed leg engaged thereto, is achieved by the body of the device by a simple lowering of the shelving from the elevated position above the gondola skate, where it is held by the forks, and onto the gondola skate.

Once elevated and supported on a plurality of wheeled bodies, the gondola shelving is easily rolled out of the way so as to allow users to clean the underlying floor or shelf-hidden wall surfaces of food, dirt and debris which collects in the heavily trafficked convenience store environment. This aids in the sanitary and olfactory upkeep of such stores and encourages customers to return.

Returning the shelving to its former position is easily handled by a reverse order where the shelving is lifted by the forks of the lever once in position, and held elevated securely by the plurality of gondola skate bodies, until the gondola skates are removed. Thereafter, the gondola shelving is lowered to its former position supported on the vertically disposed legs which support the horizontally disposed members.

With respect to the above description, before explaining at least one preferred embodiment of the herein disclosed gondola lifting and rolling system in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art.

Also, it is to be understood that the phraseology and terminology employed herein are for the purpose of description and should not be regarded as limiting. As such, those skilled in the art will appreciate that the conception upon which this disclosure is based may readily be utilized as a basis for designing of other structures, methods and systems other than the disclosed gondola shelving of Royston LLC for carrying out the several purposes of the present disclosed device. It is important, therefore, that the claims be regarded as including such equivalent construction and methodology insofar as they do not depart from the spirit and scope of the present invention.

It is an object of this invention to provide an improved system for the moving and replacement of gondola shelving such as that employed in convenience stores such as 7-ELEVEN.

It is an additional object of this invention to provide such a system requiring no jacks or hydraulic lifting devices by employing simple tilting lifting members which are adapted to engage within the horizontal support members for such gondola shelving for both elevating and lowering the engaged gondola shelf.

A further object of this invention is the provision of such a lifting system wherein gondola skates are provided which have surfaces formed which are complimentary to those of the raised shelving to provide a means for concurrent engagement of both the vertical leg and horizontal members in a supported engagement during a lowering of the gondola shelving from an elevated position.

It is a further object of this invention to provide for gondola skates which when supporting a shelf or gondola, will roll in all four directions without the need to initially pivot or in some cases roll the supporting wheel, thereby providing means for easy directional movement once engaged with the gondola skates.

These together with other objects and advantages which become subsequently apparent reside in the details of the construction and operation as more fully hereinafter described and claimed, reference being had to the accompanying drawings forming a part thereof, wherein like numerals refer to like parts throughout.

BRIEF DESCRIPTION OF DRAWING FIGURES

FIG. 4 shows a typical horizontal support member for such convenience store gondola shelving.

FIG. 5 depicts the wheeled gondola skate in a complimentary engagement with surfaces of the horizontally disposed support member for the gondola shelf.

FIG. 6 depicts the gondola shelf having complimentary engagements formed on an upward facing surface to engage the gondola shelf as shown in FIG. 5.

FIG. 7 shows a typical multiple configuration for the horizontal support members for such convenience store gondola shelving.

FIG. 8 depicts the wheeled gondola skate in a complimentary engagement with multiple horizontal support members using a complimentary shaped engagement surface of the gondola skate of FIG. 9.

FIG. 9 depicts the gondola skate from the engaged depiction of FIG. 8.

FIG. 10 depicts a typical frusto-conical shaped support leg employed on some such convenience store gondola shelving.

FIG. 11 depicts a mode of the gondola skate having a complimentary depression in the upper facing surface of the skate body, and a leg engaging depression, both configured for concurrent engagement during a lowering of the elevated gondola skate.

FIG. 12 depicts a side view of a gondola skate holding the gondola shelving elevated and showing the skate body having a positive engagement with the gondola shelf member and leg and a plurality of multi directional wheels employed for support although a single wheel may also be employed.

DETAILED DESCRIPTION OF THE PREFERRED EMBODIMENTS OF THE INVENTION

Figure 1:
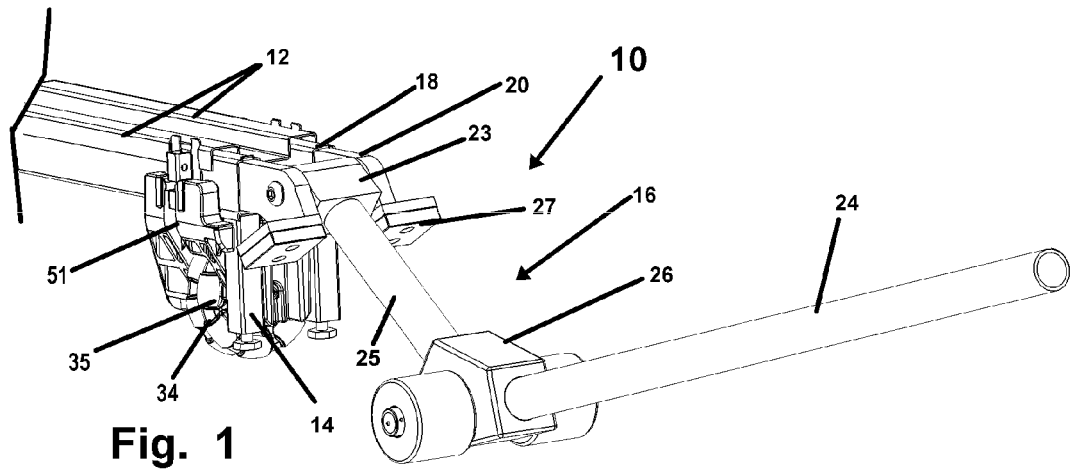
FIG. 1 depicts a perspective view of a preferred mode of the device showing the lifting component operatively engaged with at least one horizontally disposed gondola shelf support member, preferably by engagement with axial passages.

Referring now to the drawings of FIGS. 1-13, the device 10 is depicted in various views which make the structure and function of the device 10 and system herein, clear to those skilled in the art and as shown for exemplar, is especially well adapted for employment with gondola shelving employed conventionally in small convenience stores with high customer traffic such as 7-ELEVEN.

As disclosed herein the device 10 is adapted to engage horizontal support beams 11 and which are held elevated above a support surface such as a floor 12 by support posts 14. Such gondola shelving is similar to larger conventional gondola shelving used in grocery stores for products, but is smaller in stature and adapted for high sales traffic of food, drinks, and convenience items in a small store footprint. An example of such convenience store gondola shelving is that which is supplied for such venues by Royston LLC of Jasper, Ga., and similar firms who supply such specialized gondola shelving for convenience stores.

As shown in FIG. 1, the system 10 provides a means for lifting the existing shelving, which is provided in the preferred mode by a lifting component 16. The lifting component 16 is configured on one end to operatively engage with horizontally disposed support members of the gondola, such as with at least one axial passage 18 of the support member 11.

Figure 2:
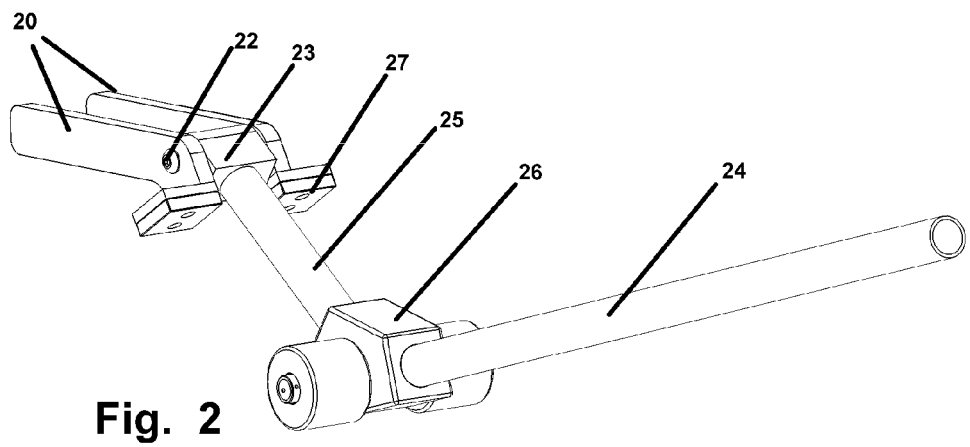
FIG. 2 is a perspective view of the lifting component prior to engagement with the gondola shelving and depicting the projecting forks for engaging the horizontal members, and a lifting lever extending from a common wheeled chassis.

In FIG. 2 there is provided a perspective view of the lifting component 16 prior to engagement with the gondola shelving as shown in FIG. 1. Depicted are the projecting forks 20 which are rotationally engaged at a pivot 22 such that they may be rotated toward the lifting lever 24, on the means for rotational engagement provided by the pivot 22 which is positioned on a mount 23. The mount 23 is extended from the wheeled chassis 26 by an extension member 25.

Shown in a projected position, the forks 20 when rotated toward the lifting lever 24, position a pad 27, which may be used to lift the gondola shelving by engagement against under surfaces thereof such as with the lower surface of support member 11 closest to the floor or support surface.

The extension member 25 extends at an angle, and for a distance, to position the forks 20 for operative engagement with the support member 11 such as into the axial passage 18 of the support member 11. Thereafter in this engaged position, a lifting of the support member 11, and gondola overhead, above the gondola skate body 30, is easily accomplished as is a subsequent descending engagement therein by a simple tilting of the handle.

Figure 3:
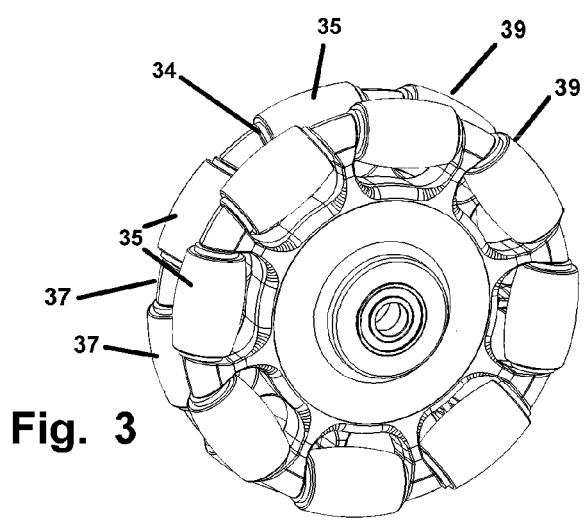
FIG. 3 shows the preferred multi directional wheel having dual circumferential supporting edges which allows for multi directional rolling of the engaged gondola shelving without the need for a pivot, or a steering of the wheel.

As noted, once so engaged with a plurality of gondola skate bodies 30, the elevated gondola shelving is easily pushed in any direction on the preferred multi directional wheel 34 shown in FIG. 3. The wheel 34 is engaged upon an axle to the body 30 through a center bearing in the conventional fashion. However, the preferred multi directional wheel 34 has two circumferential supporting surfaces and provides a means for multi directional rolling of the engaged gondola shelving with no pivot or turning of the wheel 34, as is required with conventional wheels. While conventional wheels may be employed herewith, the system 10 provides increased utility using the multi directional wheel 34, rotationally engaged to rotate around a first axis, and having a plurality of rotationally engaged secondary bearings or rollers 35 circumferentially engaged about the two opposing circumferential support surfaces of the wheel 34.

This is a preferred mode of the device 10, as it renders the act of final positioning which involves inches or less much easier, as well as turning in tight quarters. This is because the supported gondola shelving on the wheels 34 will rotate along a first axis R1 (FIG. 13) and on the rotatingly engaged rollers 35 on a second axis R2 (FIG. 13) normal to the first axis or the axis of the wheels 34. Consequently the gondola or shelf being supported by the wheeled bodies 30, need not be rolled any significant distance, as with conventional devices, to align and finally position the gondola, or turn or navigate with the gondola in close quarters.

Instead the wheel 34 with two rows of opposing circumferentially engaged rollers 35, which always contact the floor as each opposing roller 35 on one of the supporting circumferential surfaces, is located across from a gap 37 in the other circumferential surface. This insures that contact by the wheel 34 with the floor is only on a roller 35 and as such the wheel will roll easily in any intended direction of translation or movement of the supported gondola.

As noted, each wheel 34 is formed to have two circumferential supporting edges. On each such edge, there is a gap 37 positioned directly across from a roller 35 engaged to the opposite circumferential supporting edge. Consequently, no matter what position a wheel 34 is rotated around its axis, there will always be a contact with the floor or support surface by a roller 35 circumferentially engaged one or the other of the supporting edges. The gaps 37 positioned opposite each roller 35, on each supporting edge, insure that no static part of the wheel engages the support surface which would impede the rotation on a roller 35 since the portion of the wheel having a gap 37, does not touch the support surface.

In FIG. 4, there is shown a horizontal support member 11 used singularly or in pairs as shown in FIG. 7, for supporting store-situated gondola shelving. The complimentary formed configuration, of the upper surface 31 of the gondola skate body 30, which is dimensioned for a supporting in a cradled engagement at least one support member 11, as shown in FIG. 5 in an engaged position. In this engaged position, the device elevates the support posts 14 above the support surface or floor and so positioned, ready for multi directional rolling thereon. An enlarged view is shown in FIG. 6, which depicts in more detail the upper surface 31 of the gondola skate body 30 having complimentary configured recesses providing the complimentary engagements with a support member 11, formed in the body 30 in an upper surface 31 relative to the underlying support surface. So positioned the to engage around and support the gondola shelf support member 11 which is shown in the engaged and elevated position in FIG. 5.

FIG. 7 shows a typical multiple configuration for paired horizontal support members 11 for such convenience store gondola shelving. For supporting in the elevated position, FIG. 8 shows the multi directional wheeled gondola skate body 30 in a complimentary saddled or supported engagement with the lower and side surfaces of the multiple horizontal support members 11. A similar complimentary engagement supporting upper surface 31 of the gondola skate body 30 shown in FIG. 8, provides the means for engagement and support in the elevated position for the body 30 to the gondola shelving.

This engagement is achieved using a means for lifting such as a jack, but in the preferred mode noted, by using the lifting component 16 due to the speed it provides in the easy lifting, engagement, and de-engagement of the gondola shelving to the respective gondola skate bodies 30 of the system such as shown in FIG. 9. This speed is especially useful in the cramped, busy confines of a convenience store which may be open 24 hours a day, but still needs to move the gondola shelving for cleaning and maintenance of the venue and shelves themselves.

FIG. 10 depicts a typical frusto-conical shaped support leg 40 employed on some such convenience store gondola shelving to hold the support members 11 and the overhead gondola shelving, elevated above the floor. As depicted in FIG. 11, one preferred mode of the gondola skate body 30 is formed with a complimentary shaped depression 45 with an opening facing the surface 31 of the body 30 of the gondola skate when situated for engagement to the gondola shelving by elevation with the lifting component 16.

With the formed depression 45, the gondola shelving leg 14 may be raised above the body 30 and then quickly lowered into the formed depression 45 whereafter the shelving is held in the elevated position by the gondola skate, and ready for a rolling in any direction upon the operatively engaged wheel 34.

In FIG. 12 depicts there is shown a side view of the device as in FIG. 8, where the gondola shelving (not shown) is held in an elevated position above a support surface, once the support member 11 engaged thereto, is lowered to engage to an engaged position with the complimentary surface formed in the body 30 of the gondola skate. Also shown, is a pair of flexing opposing connection members 46 which are shaped to slide upon opposing flanges 48 (FIG. 7) which are engaged to the support member 11, and deflect away during insertion. Upon engaging with the top surface 31 of the body 30, projecting distal portions 49 of the connection member 46, are shaped to achieve a biased engagement within formed slots 50 in the flanges also shown in FIG. 7. Alternatively, the depressions 51 the upper surface 31 may be formed for a compressive fit against opposing sides of the support member 11, or other means for a removable locking engagement to the body 30 may be used.

Figure 13:
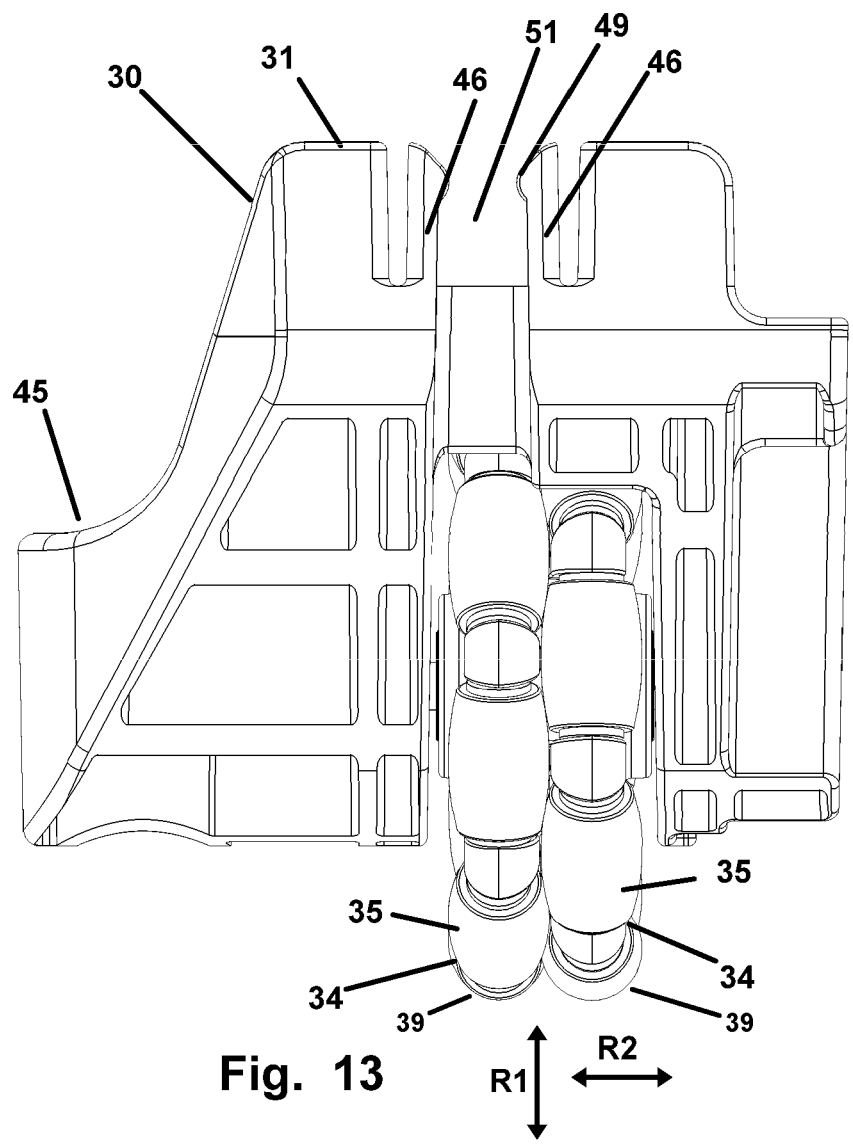
FIG. 13 depicts a gondola skate of FIG. 12 showing the formed complimentary surface of the skate and the biased opposing engagement members of the skate body.

Finally, FIG. 13 depicts a view of the supporting gondola skate body 30 depicted in FIG. 12, from the opposite side and showing both the shaped depression 45 for engaging the leg 14 while concurrently achieving a saddled or cradled engagement of the body 30 with the support member 11 in the form of engagement slot 51 and connection members 46, by simply lowering the member 11 and leg 14 into the properly registered depression 45 and slot 51. As noted other means to achieve a safe fixed engagement of the support member 11 may be employed such as a frictional engagement by surfacing the sides of the engagement slot 51 with anti slip surfacing or by a tapering of the sidewalls of the slot 51 to a slightly narrower bottom from a wider top opening to achieve a compressive fit to the sides of the support member 11.

While all of the fundamental characteristics and features of the gondola shelving lifting and transport system have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the claims.

What is claimed is:

1. An apparatus for moving display cases elevated above a support surface by support posts supporting a horizontally disposed member engaged to said display case, comprising:
    a body, said body having a first surface positioned closest to said support surface, and a second surface opposite said first surface;
    said body supported for rolling on said support surface by at least one wheel rotationally engaged with said body;
    said second surface having a surface portion dimensioned for an engagement with an underside of said horizontal support member supported above said support surface by a support post extending to a distal end contacting with said support surface, when said horizontal support member is lowered from a raised elevation positioned overhead said second surface of said body;
    said horizontal support member in said engagement, providing means elevating said support post from a supported position with said distal end resting on said support surface, to an elevated position with said distal end of said support post elevated above said support surface; and
    whereby said display case is repositionable to different positions by rolling said body upon said supporting surface while said support post is in said elevated position.

2. The apparatus for moving display cases of claim 1, additionally comprising:
    a lifting component, said lifting component having a chassis supported above said support surface by a rotationally engaged roller;
    a handle having a first position projecting from a first side of said chassis at an incline relative to said support surface;
    an engagement component projecting from a second side of said chassis, opposite said first side;
    said engagement component configured for a cooperative engagement with said horizontal support member; and
    a tilting of said handle from said first position toward a said support surface, with said engagement component in said cooperative engagement, thereby lifting said horizontal support member to said raised elevation.

3. The apparatus for moving display cases of claim 2 wherein said engagement component comprises:
    a fork extending to a distal end from an attachment of a first end on said second side of said chassis to;
    said fork dimensioned to engage within an axial cavity of said horizontal member; and
    said engagement within said axial cavity forming said cooperative engagement with said horizontal member.

4. The apparatus for moving display cases of claim 3, additionally comprising:
    an extension engaged with said second side of said chassis at a first end, and extending to a distal end at an inclined angle relative to said support surface with said handle in said first position; and
    said attachment of said first end of said fork positioned at said distal end of said extension.

5. The apparatus for moving display cases of claim 4, additionally comprising:
    said attachment of said first end of said fork at said distal end of said extension being a rotational attachment.

6. The apparatus for moving display cases of claim 1, additionally comprising:
    said wheel having a circumferential edge for rolling upon said support surface in a first direction;

a first plurality of rollers rotationally positioned upon said circumferential edge, each said roller in said first plurality of rollers having an axis running parallel with said circumferential edge; and whereby said body is moveable in a first direction aligned with said circumferential edge, by a rotation of said wheel on said support surface, and said body is moveable in a second direction traverse to said first direction by a rotation of a said roller from said first plurality of rollers upon said support surface.

7. The apparatus for moving display cases of claim 2, additionally comprising:

said wheel having a circumferential edge for rolling upon said support surface in a first direction;

a first plurality of rollers rotationally positioned upon said circumferential edge, each said roller in said first plurality of rollers having an axis running parallel with said circumferential edge; and whereby said body is moveable in a first direction aligned with said circumferential edge, by a rotation of said wheel on said support surface, and said body is moveable in a second direction traverse to said first direction by a rotation of a said roller from said first plurality of rollers upon said support surface.

8. The apparatus for moving display cases of claim 3, additionally comprising:

said wheel having a circumferential edge for rolling upon said support surface in a first direction;

a first plurality of rollers rotationally positioned upon said circumferential edge, each said roller in said first plurality of rollers having an axis running parallel with said circumferential edge; and whereby said body is moveable in a first direction aligned with said circumferential edge, by a rotation of said wheel on said support surface, and said body is moveable in a second direction traverse to said first direction by a rotation of a said roller from said first plurality of rollers upon said support surface.

9. The apparatus for moving display cases of claim 4, additionally comprising:

said wheel having a circumferential edge for rolling upon said support surface in a first direction;

a first plurality of rollers rotationally positioned upon said circumferential edge, each said roller in said first plurality of rollers having an axis running parallel with said circumferential edge; and whereby said body is moveable in a first direction aligned with said circumferential edge, by a rotation of said wheel on said support surface, and said body is moveable in a second direction traverse to said first direction by a rotation of a said roller from said first plurality of rollers upon said support surface.

10. The apparatus for moving display cases of claim 5, additionally comprising:

said wheel having a circumferential edge for rolling upon said support surface in a first direction;

a first plurality of rollers rotationally positioned upon said circumferential edge, each said roller in said first plurality of rollers having an axis running parallel with said circumferential edge; and whereby said body is moveable in a first direction aligned with said circumferential edge, by a rotation of said wheel on said support surface, and said body is moveable in a second direction traverse to said first direction by a rotation of a said roller from said first plurality of rollers upon said support surface.

11. The apparatus for moving display cases of claim 6, additionally comprising:

a second plurality of rollers rotationally positioned upon said circumferential edge, each of said second plurality of rollers having an axis running parallel with said circumferential edge;

gaps positioned between each of said second plurality of rollers; and said gaps positioned between each of said second plurality of rollers aligned with a respective roller on said first plurality of rollers.

12. The apparatus for moving display cases of claim 7, additionally comprising:

a second plurality of rollers rotationally positioned upon said circumferential edge, each of said second plurality of rollers having an axis running parallel with said circumferential edge;

gaps positioned between each of said second plurality of rollers; and said gaps positioned between each of said second plurality of rollers aligned with a respective roller on said first plurality of rollers.

13. The apparatus for moving display cases of claim 8, additionally comprising:

a second plurality of rollers rotationally positioned upon said circumferential edge, each of said second plurality of rollers having an axis running parallel with said circumferential edge;

gaps positioned between each of said second plurality of rollers; and said gaps positioned between each of said second plurality of rollers aligned with a respective roller on said first plurality of rollers.

14. The apparatus for moving display cases of claim 9, additionally comprising:

a second plurality of rollers rotationally positioned upon said circumferential edge, each of said second plurality of rollers having an axis running parallel with said circumferential edge;

gaps positioned between each of said second plurality of rollers; and said gaps positioned between each of said second plurality of rollers aligned with a respective roller on said first plurality of rollers.

15. The apparatus for moving display cases of claim 10, additionally comprising:

a second plurality of rollers rotationally positioned upon said circumferential edge, each of said second plurality of rollers having an axis running parallel with said circumferential edge;

gaps positioned between each of said second plurality of rollers; and said gaps positioned between each of said second plurality of rollers aligned with a respective roller on said first plurality of rollers.

* * * * *